(12) United States Patent
Bostick, III

(10) Patent No.: US 7,254,999 B2
(45) Date of Patent: Aug. 14, 2007

(54) PERMANENTLY INSTALLED IN-WELL FIBER OPTIC ACCELEROMETER-BASED SEISMIC SENSING APPARATUS AND ASSOCIATED METHOD

(75) Inventor: Francis X. Bostick, III, Houston, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 22 days.

(21) Appl. No.: 10/801,076

(22) Filed: Mar. 15, 2004

(65) Prior Publication Data

US 2005/0173111 A1    Aug. 11, 2005

Related U.S. Application Data

(60) Provisional application No. 60/454,839, filed on Mar. 14, 2003.

(51) Int. Cl.
*E21B 49/00*    (2006.01)
(52) U.S. Cl. .................. 73/152.16; 73/152.47
(58) Field of Classification Search ............ 73/152.16, 73/152.17, 152.46, 152.47, 152.58; 166/250.01
See application file for complete search history.

(56) References Cited

U.S. PATENT DOCUMENTS

| | | | |
|---|---|---|---|
| 6,072,567 A | | 6/2000 | Sapack et al. |
| 6,175,108 B1 | | 1/2001 | Jones et al. |
| 6,488,116 B2 | * | 12/2002 | Bailey ........................ 181/108 |
| 6,575,033 B1 | * | 6/2003 | Knudsen et al. .......... 73/514.26 |
| 6,888,972 B2 | | 5/2005 | Berg et al. |
| 6,891,621 B2 | | 5/2005 | Berg et al. |
| 6,910,534 B2 | * | 6/2005 | Linyaev et al. ......... 166/250.11 |
| 2004/0065437 A1 | | 4/2004 | Bostick et al. |
| 2004/0065443 A1 | | 4/2004 | Berg et al. |
| 2004/0067002 A1 | * | 4/2004 | Berg et al. ..................... 385/12 |
| 2004/0114463 A1 | | 6/2004 | Berg et al. |
| 2004/0202401 A1 | | 10/2004 | Berg et al. |

OTHER PUBLICATIONS

Dirks, Volker, et al., "High-resolution images from 4-C horizontal-well VSP data," SEG Technical Program Expanded Abstracts (2002), pp. 2341-2344, vol. 21.
F. Bostick "Field Experimental Results of Three-Component Fiber-Optic Sensors," 70th Annual International Mtg., Society of Exploration Geophysicists, Aug. 2000.
D. Gysling & F. Bostick, "Changing Paradigms in Oil and Gas Reservoir Monitoring—The Introduction and Commercialization of In-Well Optical Sensing Systems," Optical Fiber Sensor Conference, May 2002.
M. Eriksrud, "Fiber Optic Sensing Technology—In-well and Deepwater Applications," Demo 2000 Annual Conference, Nov. 2000.

* cited by examiner

*Primary Examiner*—Charles Garber

(57) ABSTRACT

Embodiments of the present invention include a fiber optic seismic sensing system for permanent downhole installation. In one aspect, the present invention includes a multi-station, multi-component system for conducting seismic reservoir imaging and monitoring in a well. Permanent seismic surveys may be conducted with embodiments of the present invention, including time-lapse (4D) vertical seismic profiling (VSP) and extended micro-seismic monitoring. Embodiments of the present invention provide the ability to map fluid contacts in the reservoir using 4D VSP and to correlate micro-seismic events to gas injection and production activity.

28 Claims, 5 Drawing Sheets

PERMANENTLY INSTALLED IN-WELL FIBER OPTIC ACCELEROMETER-BASED SEISMIC SENSING APPARATUS AND ASSOCIATED METHOD

CROSS-REFERENCE TO RELATED APPLICATIONS

This application claims benefit of U.S. Provisional Patent Application Ser. No. 60/454,839, filed Mar. 14, 2003, which is herein incorporated by reference in its entirety.

BACKGROUND OF THE INVENTION

1. Field of the Invention

Embodiments of the present invention are directed to apparatus and methods for in-well seismic sensing using fiber optic accelerometers. Embodiments of the present invention also are directed to apparatus and methods for in-well seismic sensing using optical hydrophones.

2. Description of the Related Art

Installing permanent seismic sensors in a wellbore to detect the movement of fluids over time in a surrounding reservoir would represent a significant advance in reservoir management, and is considered by many as a key element for instrumented oilfields. As companies focus more on maximizing recovery in existing and future fields, improved production and reservoir management is becoming increasingly important.

Conventional borehole seismic techniques, such as vertical seismic profiling ("VSP"), have been utilized for many years. VSP typically involves suspending an array of geophone sensors temporarily in the wellbore on a wireline, while actuating a seismic source at the surface. The sound waves generated by the source penetrate the earth and are reflected by rock and fluid interfaces, with the reflected signals being picked up by the geophones. As the surface source and/or geophone array is moved, a different set of reflections is received, helping to build up a seismic image of the subsurface in the vicinity of the well. Compared with normal seismic surveys which have both source and sensors at the surface, the result is a more detailed image of the reservoir, in which the distance that can be 'seen' from the wellbore is roughly determined geometrically by the depth of the well and the sensor locations. A variation on this theme is to locate the seismic source in a nearby wellbore rather than on the surface. Both of these methods are typically referred to as "active" monitoring.

Additional information can be gathered using conventional downhole seismology by "passive" monitoring in which no seismic source is used. Instead, the downhole sensors detect the natural seismicity of the reservoir and near-well region, for example, the "microseismic" signals emitted by rock formations as they are compacted and crack. Such passive monitoring has been used, for example, to verify the sinking of seabeds during gas extraction, and more generally to detect fluid movement through formations.

Another type of seismic downhole sensor which is currently utilized is a hydrophone. Hydrophones are used in a number of applications involving sensing acoustic pressures in fluidic media (e.g., liquid).

While seismic data can be actively or passively gathered using wireline-deployed geophones or hydrophones, seismic readings can only be taken periodically and require well intervention, perhaps requiring the cessation of fluid flow (i.e., production or injection) in the well. Moreover, while permanent geophone arrays have been deployed in relatively shallow wells, they are unsuitable for deeper deployments because their complexity and associated electronics cannot withstand the high temperatures and pressures encountered downhole for long periods of time. Downhole components must be adequately secured in place in the wellbore and must survive and consistently perform for as long as 20 years.

By contrast, optical sensors, such as optical fiber-based sensors, are significantly more resilient and have no moving parts or electronics to potentially be damaged by the downhole environment. Optical sensors have been deployed in wells to detect pressures, temperatures, distributed temperatures, flow rates, and even phase fractions.

There is therefore a need for a seismic system which may be permanently deployed in a well which is more resilient and resistant to damage due to the downhole environment. There is also a need for a seismic system which is suitable for permanent, deep deployments. Additionally, there is a need for a seismic system deployable in a well which can withstand high temperatures and pressures downhole for long periods of time.

SUMMARY OF THE INVENTION

Embodiments of the present invention generally provide a fiber optic seismic sensing system for permanent downhole installation. In one embodiment, a multi-station, multi-component system is deployed to conduct seismic reservoir imaging and monitoring in a well. In one aspect, at least two types of permanent seismic surveys may be conducted by use of embodiments of the present invention, including time-lapse (4D) VSP and extended micro-seismic monitoring. Embodiments of the present invention possess the ability to map fluid contacts in the reservoir using 4D VSP and to correlate micro-seismic events to gas injection and production activity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the present invention include an optical seismic sensing system for gathering both active and passive seismic data that can be installed permanently in-well to collect seismic data and/or fluid movement data on demand. Embodiments of the present invention provide a multi-channel, multi-component, fiber optic seismic sensing system for in-well applications.

Embodiments of a downhole seismic sensor system using optical sensing technology (e.g., optical fibers) of the present invention provide improved information about fluid migration on a permanent basis without the need for periodic well intervention and without the use of less reliable downhole electronic devices.

The following references are all incorporated herein by reference in their entireties: F. Bostick "Field Experimental Results of Three-Component Fiber-Optic Sensors," 70th Annual International Mtg., Society of Exploration Geophysicists, August 2000; D. Gysling & F. Bostick, "Changing Paradigms in Oil and Gas Reservoir Monitoring—The Introduction and Commercialization of In-Well Optical Sensing Systems," Optical Fiber Sensor Conference, May 2002; and M. Eriksrud, "Fiber Optic Sensing Technology—In-well and Deepwater Applications," Demo 2000 Annual Conference, November 2000.

Figure 1:
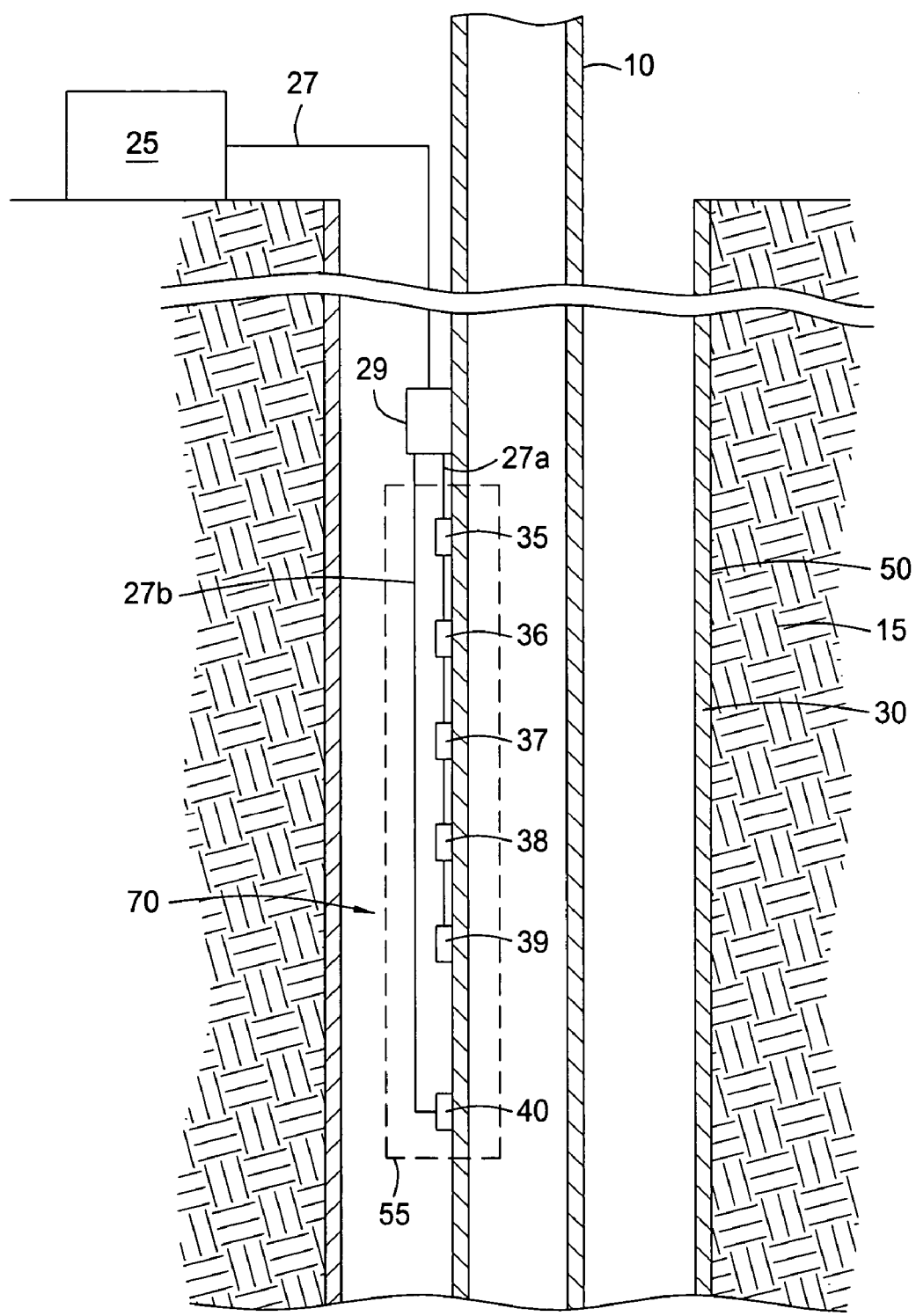
FIG. 1 schematically illustrates an embodiment of a permanent optical seismic sensing system of the present invention on production tubing.

According to embodiments of the present invention, a seismic array has a plurality of seismic stations interconnected by inter-station cables. In FIG. 1, a seismic array 55 having six stations 31, 32, 33, 34, 35, 40 is shown deployed in a wellbore 50, which has been drilled down to a subsurface production zone and is equipped for the production of petroleum effluents. A splitter 29 may be used to couple the stations 31–35 and 40 to a surface data acquisition unit 25 using optical cables 27, 27A, and 27B.

Typically, the wellbore 50 includes a casing 30 coupled to the surrounding formation 15 by cement. Sensors of the seismic stations are typically coupled to the formation via the casing. For example, various methods may be utilized to deploy the seismic stations within the casing and couple the sensors thereof to the casing (e.g., various clamping mechanisms described below. Various methods may also be utilized to deploy the seismic stations downhole. Particular embodiments described herein will refer to seismic stations deployed downhole on production tubing 10 lowered into a cased wellbore. For example, the seismic stations may be affixed to production tubing 10 at the surface, before the production tubing 10 is lowered into the cased well.

In a preferred embodiment, the seismic array 55 having six stations 31, 32, 33, 34, 35, and 40, each station 31–35, 40 having three components ("3-C"), is deployed on production tubing 10, the production tubing 10 deployed down a monitor well, as shown in FIG. 1. Although six stations 31–35 and 40 are shown in FIG. 1, any number of stations may be utilized in embodiments of the present invention. The six stations 31–35, 40 are preferably deployed at locations approximately 400 meters down the well, and, more specifically, five 3-C stations 31, 32, 33, 34, 35 are preferably deployed above the reservoir for walkaway VSP imaging. Two of these stations are active during micro-seismic monitoring survey as well. A sixth 3-C station 40 is deployed solely for micro-seismic monitoring and is positioned a few hundred meters lower than the rest of the array 55 so that the sixth station 40 is located nearer to the reservoir than the remainder of the array 55. The depth locations for the permanent seismic stations 31–35 and 40 are preferably derived from conventional wireline feasibility tests conducted in advance of the permanent installation.

In a preferable embodiment, the full fiber optic array 55 is installed sequentially along with the production tubing while it is lowered into the well. Following the well completion, the fiber optic system may be tested to confirm functional performance. Subsequently, the VSP surveys may be completed using the same acquisition parameters and energy source equipment as those used in the conventional wireline feasibility studies.

The seismic system 70 preferably used for the present invention is a fiber optic multi-channel system in which no electronics components or electrical power are required beyond the surface instrumentation, as shown by the optical circuit in FIG. 1. The surface data acquisition unit 25 provides the light source for the in-well array 55 and handles the manipulation of the downhole sensor signals.

The downhole sensor signals may optionally be multiplexed using advanced optical techniques adapted from the telecommunications and defense industries for oil and gas applications. The fiber optic sensors within the seismic system preferably contain fiber Bragg gratings ("FBGs") that reflect a narrow wavelength band of light having a central wavelength. The signals may be multiplexed by time division multiplexing ("TDM"), wavelength division multiplexing ("WDM"), or mixtures thereof. If each sensor has a different reflection wavelength, the reflected signals may be easily detected using WDM techniques. In contrast, if each sensor has the same reflection wavelength, reflected signals can be resolved in time using TDM techniques. One or more of the signals may, in lieu of multiplexing, be conveyed through separate optical cables connected to each of the stations 31–35, 40. The data are output in analog or digital format for interfacing to conventional seismic recording systems.

One or more sensors (not shown) are disposed within each station 31–35, 40. The one or more sensors may include one or more accelerometers. The sensor utilized within each station 31, 32, 33, 34, 35, and 40 may be a three-component optical accelerometer specifically designed for permanent in-well seismic applications, shown generally in FIGS. 1–2, an example of which is disclosed in further detail in U.S. patent application Ser. No. 10/266,716 entitled "In-Well Seismic Sensor Casing Coupling Using Natural Forces in Wells," filed Oct. 6, 2002, which is incorporated herein by reference in its entirety. Preferably, the three-component accelerometer includes both on-axis and off-axis fiber optic accelerometers, as are disclosed in U.S. patent application Ser. Nos. 09/410,634 entitled "Highly Sensitive Accelerometer," filed Oct. 1, 1999, and Ser. No. 10/068,266 entitled "Highly Sensitive Cross Axis Accelerometer," filed Feb. 6, 2002, both of which are incorporated herein by reference in their entireties. The three-component accelerometers are also preferably configured in a fixed, three-axis orthogonal orientation (X, Y, and Z). The accelerometers (not shown) may be arranged to measure acceleration from acoustic waves in any of three orthogonal axes and can transmit respective sensing light signals indicative of static and dynamic forces at their location on the optical fiber.

Figure 3A:
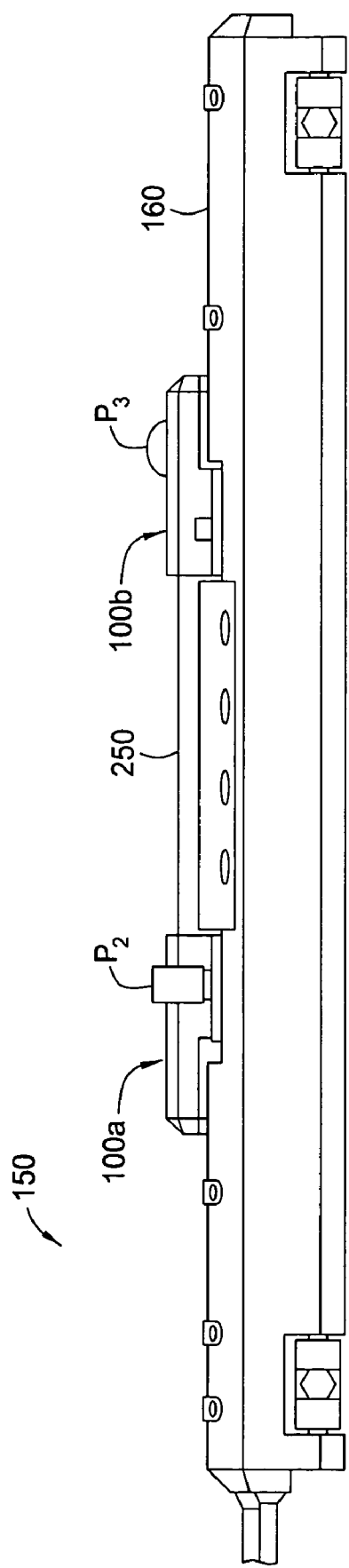
FIG. 3A shows a side view of an in-well seismic station having a clamp mechanism and a sensor mechanism.
Figure 3B:
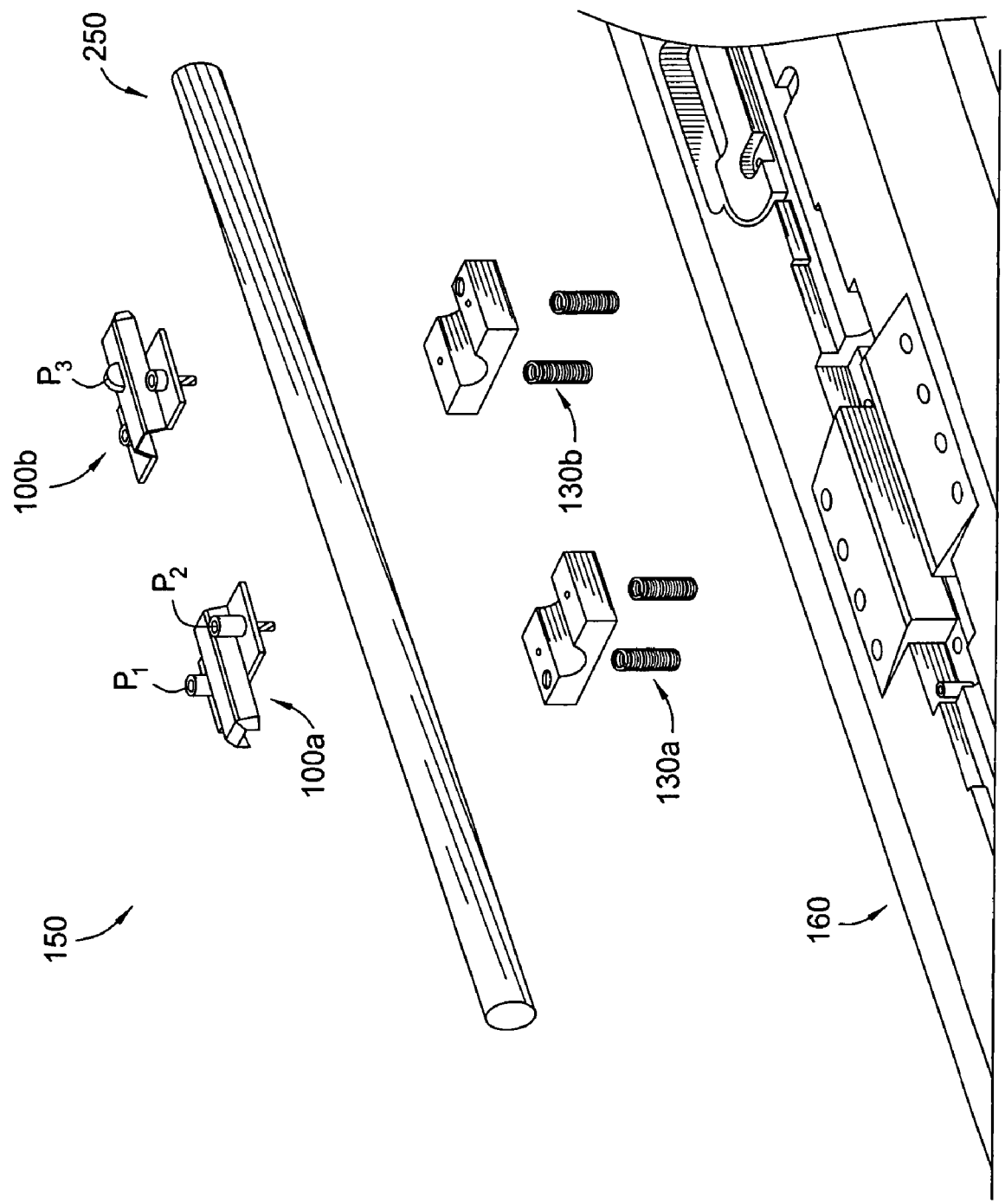
FIG. 3B shows an exploded view of the clamp mechanism and sensor mechanism of FIG. 3A.

Permanent installation may be achieved by use of an active clamp mechanism 150 shown in FIGS. 3A and 3B clamped to the production tubing 10 which deploys the accelerometer housing out against the well casing 30, as is disclosed in U.S. patent application Ser. No. 10/678,963 entitled "Clamp for In-Well Seismic Station," filed Oct. 3, 2003, which is incorporated herein by reference in its entirety. The clamp mechanism 150 is capable of coupling to production tubing 10 for deployment in the well and is actively capable of acoustically coupling a sensor with the casing 30 of the well. The clamp mechanism 150 is capable of releasing the sensor mechanism towards the casing when subjected to a predetermined pressure within the well or when subjected to fluid in the well for a predetermined amount of time.

Generally, the clamp mechanism 150 includes a sensor component 250 which, once released from a body 160 of the clamp mechanism 150 is substantially acoustically decoupled from the body 160. The sensor component 250 may be used as one or more of the seismic stations 31–35 and 40 and may include the 3-C sensors described above or may include multiple 3-C sensors disposed within more than one of the seismic stations, e.g., two, 3-C sensors.

The sensor component 250 is decoupled from the production tubing 10 and coupled to the formation 15 by biasing mechanisms 130a and 130b, which may be springs. The biasing mechanisms 130a–b push carrier mechanisms 100a and 100b having mounted sensor component 250 away from the body 160 towards the casing 30. In a preferable embodiment, the carrier mechanism 100a has two contact points $P_1$ and $P_2$ for coupling to the casing 10, while the carrier mechanism 100b has one contact point P3 for coupling to the casing 10. Additional aspects of one embodiment of the clamp mechanism 150 are described in U.S. patent application Ser. No. 10/678,963, incorporated by reference above.

In addition to deployment by the clamp mechanism 150, deployment of the accelerometer may also be achieved by housing the accelerometer in a mandrel (not shown) coupled to the production tubing 10, in which case the mandrel naturally or passively couples to the well casing 30, as is disclosed in U.S. patent application Ser. No. 10/266,716 entitled "In-Well Seismic Sensor Casing Coupling Using Natural Forces in Wells," filed Oct. 6, 2002, which is incorporated herein by reference in its entirety. The device achieves high sensitivity, large dynamic range, broad bandwidth, and high quality directional response within a short, 25-mm diameter package and is designed for continuous operation at 1000 bar and 175° C.

As disclosed in the incorporated references, the optical sensors may be based on Bragg grating technology which operate by sensing strain in the optical fiber (or other type optical waveguide) within the accelerometers. Light reflected back along the fiber at specific wavelengths may be translated into the parameter being measured (e.g., seismic signals impinging on the sensors). For some embodiments, the optical sensors may be interrogated interferometrically, in which changes to a length of fiber between a pair of gratings (caused by the measurand) may be detected as phase changes between signals reflected thereby. For seismology purposes, the parameter of interest to be sensed is acceleration, which is caused by slight movements of the earth as excited by seismic waves traveling therethrough. As alluded to earlier, the disclosed and incorporated accelerometers within the stations 31–35 and 40 comprise three separate discrete accelerometers, each of which detects acceleration along three mutually, substantially perpendicular axes. Such accelerometers are capable of sensing micro-G's or nano-G's, and hence are extremely sensitive. At this level of sensitivity, high-frequency events such as the cracking of rock can be detected, enabling microseismic signals to be sensed and located and allowing an image of the reservoir near the well to be determined.

Methods for deployment of the array 55 are disclosed in U.S. patent application Ser. No. 10/266,715 entitled "Apparatus and Method for Transporting, Deploying, and Retrieving Arrays Having Nodes Interconnected by Sections of Cable," filed Oct. 6, 2002, which is incorporated herein by reference in its entirety. This completion design allows for easy access through the production tubing 10 to the reservoir for logging tools. In some embodiments, fiber optic cabling 27 carries three optical fibers to link the stations 31–35 and 40 of the sensor array 55 together and to link the array 55 to seismic recording devices 25 residing nearby the well.

In an embodiment, each 3-C sensor station 31–35, 40 is attached to the production tubing 10 using the active deployed clamp mechanism 150 incorporated earlier (U.S. application Ser. No. 10/678,963), and shown in FIG. 2. This clamp mechanism 150 couples the sensors to the casing 30 while substantially decoupling the sensors from the production tubing 10 and from cable-borne noise and further allows the sensor station 31–35, 40 to readily pass by any gaps that can occur at the casing connections. A multi-finger caliper run may be conducted prior to the installation to evaluate the inside surface of the casing 30 for unexpected conditions. In another embodiment which is not shown, multiple sensors are housed within one clamp mechanism 150 and deployed to couple to the formation 15 by the clamp mechanism 150 simultaneously or at separate times.

Figure 2:
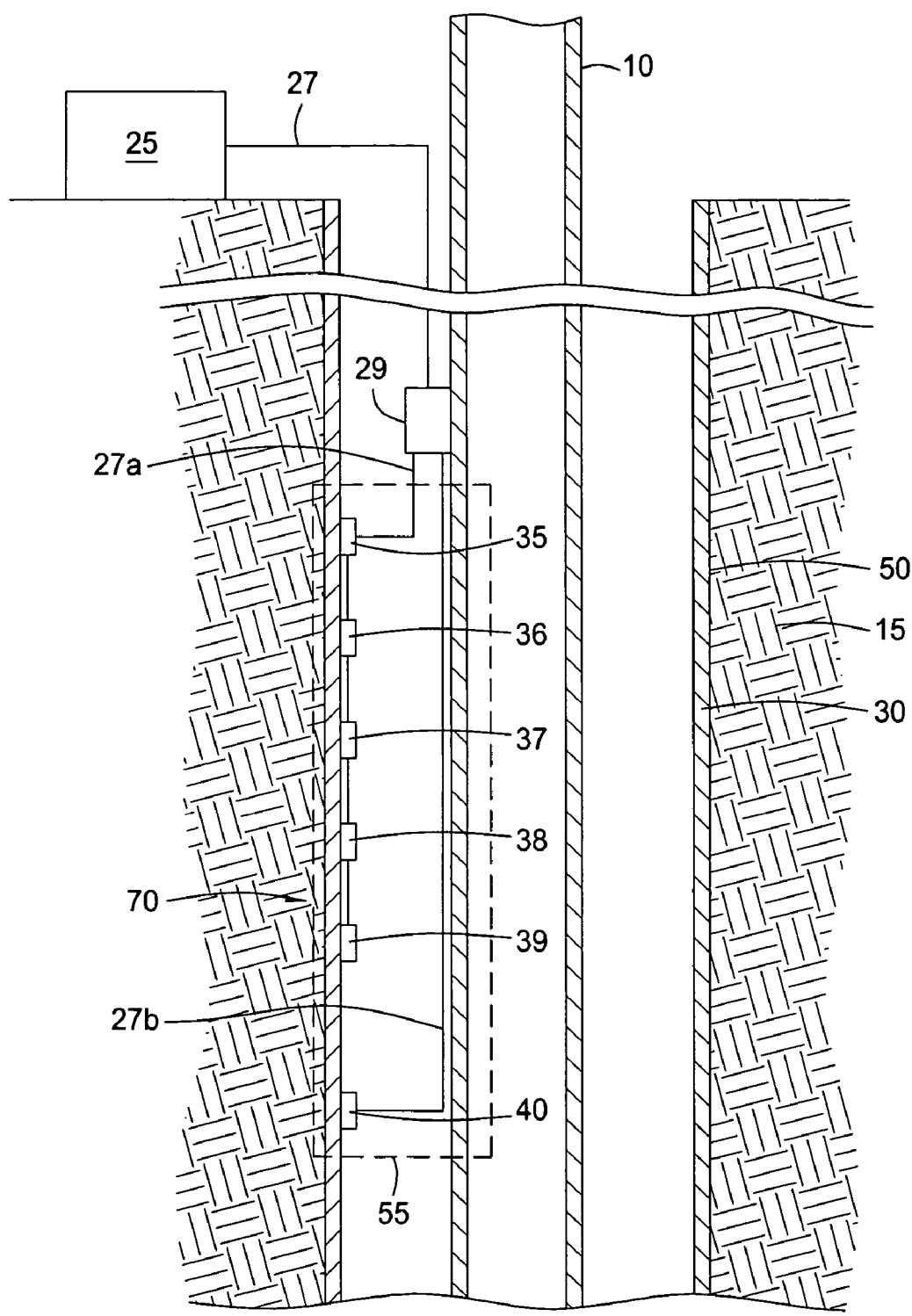
FIG. 2 schematically illustrates an embodiment of the permanent optical seismic sensing system of FIG. 1 in the deployed position.

In one embodiment of the present invention, referring to FIGS. 1–2, the deepest station 40 is deployed first, followed by the shallower remaining stations 31–35 of the multi-station array 55. The deployment system incorporated earlier (described in U.S. application Ser. No. 10/266,715) allows the contiguous array 55 to be serially guided onto the tubing while simultaneously allowing for tubing connections and the installation of cable protectors. Similar to standard downhole gauge installations, a cable protector (not shown) may be installed at each tubing joint. Strategically positioned, standard tubing centralizers (not shown) may be also installed to ensure optimal sensor coupling and to minimize the risk of the seismic array 55 becoming lodged in the wellbore 50, a precaution thought prudent given that the production tubing 10 may be required to penetrate the casing 30 just inside the reservoir.

For some embodiments, the production tubing 10 may be secured at the wellhead by means of a tubing hanger, and the fiber optic cable 27 penetrates the hanger via a cable pressure seal to a wellhead junction box. The in-well fiber optic cable 27 is terminated at the box and an optical surface cable 27 is routed to the surface instrumentation 25, which may be housed in a lab cabin positioned near the wellhead.

For some embodiments, the sensor signals output from the fiber optic instrumentation 25 are interfaced in analog form to a conventional seismic recording system. Alternatively, the sensor signals may be utilized in digital form. If available, comparisons can be made to field data previously acquired with a conventional wireline VSP tools to determine if substantially similar data results from a Z-axis trace acquired with a conventional geophone VSP tool and a Z-axis trace from one of the fiber optic stations 31–35 or 40, after converting the data into a common domain, e.g., velocity or acceleration. Additionally, comparisons of shot gathers of a common receiver (conventional three-component geophones) versus shot gathers consistent with embodiments of the present invention (three-component fiber optic accelerometers), the accelerometers located at approximately the same depth as the geophones, can be made to determine if substantially similar data results from the accelerometers after integrating the accelerometer data to the data obtained by the conventional geophones.

The disclosed system and techniques are expected to benefit all oil/gas wells, but are especially expected to benefit certain more difficult wells where in-well seismology is difficult or presently not feasible. For example, in offshore wells, higher frequencies of conventional surface seismic signals are attenuated as they pass through the soft seabed, a condition also experienced in desert locations, leaving only the 'broader range' view that is generated by lower frequencies, around 30–50 Hz. By contrast, the disclosed in-well seismic system 70 enables higher frequency signals, typically 80–100 Hz or more, to reach the downhole sensors, providing a higher resolution assessment of the reservoir close to the wellbore 50. Deep wells in reservoirs lying below salt formations, such as those encountered in the Gulf of Mexico, should similarly benefit from the disclosed techniques. Seismic signals are scattered by salt formations, making imaging of deep reservoirs difficult; therefore, in-well surveys should deliver much clearer images. Procuring clean images below gas formations is also problematic, and again optical in-well seismic surveys could reveal much needed data for such reservoirs, such as detection of the movement of water injection fronts that are indicative of how fast a well should be produced.

Embodiments of the present invention thus demonstrate the operation and functionality of a permanent installation of a multi-station, multi-component fiber optic seismic system 70 in a wellbore. A distributed array 55 of fiber optic sensors could be readily deployed on production tubing 10 in a cased hole 50 with minimal impact to the well. Embodiments of the present invention allow VSP to be conducted with good coupling of the sensors to the formation and high-quality sensor performance. The fiber optic system 70 of the present invention allows 4-D imaging and continuous monitoring for the purpose of better understanding the dynamic behavior of the oil and production and storage operations.

Figure 4:
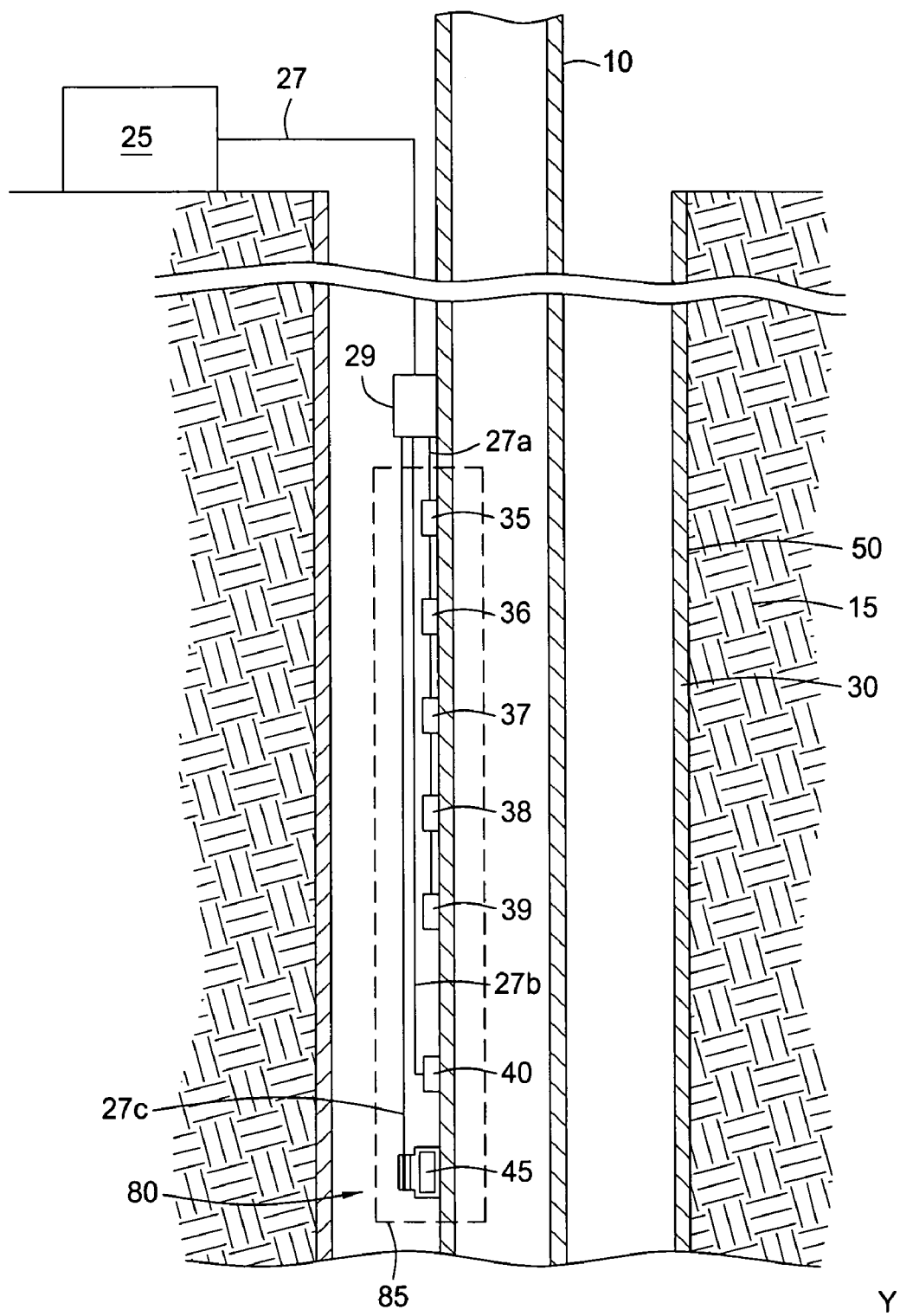
FIG. 4 schematically illustrates an alternate embodiment of a permanent optical seismic sensing system of the present invention on production tubing.

In an alternate embodiment, as shown in FIG. 4, a seismic fiber optic sensor system 80 may be utilized on production tubing 10 for VSP. The fiber optic system 80 includes a seismic sensor array 85. The seismic sensor array 85 includes one or more fiber-optic based hydrophones 45, for example the fiber-optic based hydrophones shown and described in a co-pending U.S. patent application filed on Mar. 9, 2004 having Attorney Docket Number WEAT/0471.P1 and entitled "High Pressure and High Temperature Acoustic Sensor", which is herein incorporated by reference in its entirety, may be used to sense acoustic pressures in fluidic media (i.e., gas or liquid). The optical hydrophone disclosed in WEAT/0471.P1 is deployable in harsh environments where fluidic media possesses high temperature, high pressure, and/or potentially caustic chemicals. The hydrophone includes a housing having a diaphragm and a sensing mandrel. The housing is filled with an internal fluid, and the diaphragm separates the internal fluid in the housing from the fluidic media. The sensing mandrel senses the acoustic pressure transmitted to the internal fluid through the diaphragm. The sensing mandrel is preferably tubular and composed of a polymer having a coil of optical fiber wound and bonded to its outer surface.

In the embodiment shown in FIG. 4, a seismic array 85 is disposed on production tubing 10 by one or more clamping mechanisms or other comparable methods of ultimately coupling the seismic array 85 to the production tubing 10. The seismic array 85 shown in FIG. 4 includes six stations 31–35, 40, each having one or more optical sensors (preferably accelerometers) therein, as well as a hydrophone 45. Preferably, each seismic station 31–35, 40 includes three optical sensor components (not shown), most preferably orthogonally arranged as described above. The clamping mechanism or other method is capable of decoupling the optical accelerometers and the optical hydrophone 45 from the production tubing 10 and coupling the accelerometers and the optical hydrophone 45 to the formation therearound (e.g., by placing the accelerometers and the optical hydrophone 45 into physical contact with the casing 30). Typically, the hydprophone does not require mechanical coupling to the formation, but is coupled via well fluid. As a result, the hydrophone may be less susceptible to mechanical vibration of the tubing during injection/production and may, therefore, not require any special clamping mechanism. While FIG. 4 shows the hydrophone deeper than the accelerometers, it may actually be collocated with the accelerometers.

The optical hydrophone 45 is coupled to the surface data acquisition unit 25 by an optical cable 27C through the splitter 29. As described above, the signals may be multiplexed by TDM, WDM, or mixtures thereof, or in the alternative, multiple optical cables running directly to the surface data acquisition unit 25 may be connected to each station 31–35, 40 as well as to the hydrophone 45.

The arrangement of FIG. 4 is especially advantageous for acquiring useful horizontal well data. Whether in horizontal wells or vertical wells, the arrangement of FIG. 4 permits achievement of wavefield separation where the traditional procedures fail, due to lack of differential moveout by portioning acquired data into three high-resolution wavemodes—P-wave, S-wave and tubewave, all of which contribute to an improved interpretation of the prospect.

Although only one optical hydrophone 45 is shown in FIG. 4, a plurality of optical hydrophones may be employed within the wellbore 50. Additionally, any number of seismic stations 31–35, 40 for housing accelerometers may be utilized in the seismic array 85, and the stations 31–35, 40 may include any number of accelerometers therein.

While the foregoing is directed to embodiments of the present invention, other and further embodiments of the invention may be devised without departing from the basic scope thereof, and the scope thereof is determined by the claims that follow.

The invention claimed is:

1. A method for seismically surveying a formation around a wellbore, comprising:
   lowering one or more seismic stations into the wellbore, each seismic station comprising optically based seismic sensors, at least three of the sensors arranged to sense in axes approximately orthogonally positioned;
   coupling the sensors to the formation; and
   detecting one or more seismic events at each of the sensors,
   wherein the one or more seismic stations comprise a plurality of seismic stations, each seismic station comprising optically based seismic sensors, at least three of the sensors arranged to sense in axes approximately orthogonally to each other,
   wherein one or more of the plurality of seismic stations is disposed nearer to a reservoir of the formation than a remainder of the plurality of seismic stations in order to perform micro-seismic monitoring.

2. The method of claim 1, further comprising affixing the one or more seismic stations to a production pipe prior to lowering the one or more seismic stations into the wellbore.

3. The method of claim 1, wherein the remainder of the plurality of seismic stations are utilized for vertical seismic profiling.

4. The method of claim 1, wherein the plurality of seismic stations is disposed within a clamping mechanism.

5. The method of claim 1, wherein at least one optical cable interconnects the plurality of seismic stations.

6. The method of claim 5, wherein a signal from the sensors within the plurality of seismic stations is multiplexed.

7. The method of claim 1, wherein the optically based seismic sensors are accelerometers.

8. The method of claim 1, wherein the at least three of the sensors are arranged along three axes.

9. The method of claim 1, wherein coupling the sensors to the formation comprises deploying the sensors against a casing disposed in the wellbore.

10. The method of claim 1, wherein the one or more seismic stations comprise a clamping mechanism.

11. The method of claim 10, wherein coupling the sensors to the formation comprises activating the clamping mechanism to deploy at least a portion of the clamping mechanism against a casing disposed in the wellbore.

12. The method of claim 1, wherein detecting one or more seismic events at each of the sensors comprises mapping a fluid contact in a reservoir in the formation using four-dimension vertical seismic profiling.

13. The method of claim 1, wherein the one or more seismic events comprise one or more micro-seismic events.

14. The method of claim 13, further comprising correlating the one or more micro-seismic events to production activity.

15. The method of claim 13, further comprising correlating the one or more micro-seismic events to gas injection activity.

16. A method for seismically surveying a formation around a wellbore, comprising:
    lowering one or more seismic stations into the wellbore, each seismic station comprising optically based seismic sensors, at least three of the sensors arranged to sense in axes approximately orthogonally positioned;
    lowering one or more optically based hydrophones into the wellbore;
    coupling the sensors and the one or more optically based hydrophones to the formation; and
    detecting one or more seismic events at each of the sensors and the one or more hydrophones, wherein the one or more seismic events include one or more microseismic events.

17. The method of claim 16, further comprising affixing the one or more seismic stations to a production pipe prior to lowering the one or more seismic stations in the wellbore.

18. The method of claim 16, wherein the at least three optically based seismic sensors are orthogonally arranged along three axes.

19. The method of claim 16, wherein the one or more optically based hydrophones comprise:
    a housing enclosing a liquid;
    a diaphragm attached to the housing, wherein the diaphragm transmits acoustic pressures from a fluidic media to the liquid; and
    an optically based sensor positioned within the liquid for sensing the acoustic pressures in the liquid.

20. The method of claim 16, further comprising determining the difference between in-phase upwave and downwave amplitudes measured by the sensors and anti-phase downwave and upwave amplitudes measured by the one or more hydrophones to separate the downwaves and upwaves.

21. The method of claim 16, further comprising determining an image of the formation using the one or more hydrophones and the sensors.

22. The method of clam 21, further comprising comparing the image of the formation obtained by the one or more hydrophones to the image of the formation obtained by the sensors to account for mechanical resonance of the sensors.

23. The method of claim 16, wherein the sensors are accelerometers.

24. A seismic sensing system, comprising:
    a plurality of seismic stations disposed in a wellbore, each seismic station comprising optically based seismic sensors, at least three of the sensors arranged to sense in axes approximately orthogonally positioned and coupled to the formation, wherein one of the plurality of seismic stations is disposed nearer to a reservoir of the formation than a remainder of the plurality of seismic stations in order to conduct micro-seismic monitoring; and
    seismic processing equipment coupled to the one or more seismic stations by one or more optical waveguides and configured to detect one or more seismic events at each of the sensors.

25. The seismic sensing system of claim 24, further comprising a production pipe disposed within a casing in the wellbore, wherein the one or more seismic stations are affixed to the production pipe and coupled to the formation through the casing.

26. The seismic sensing system of claim 24, further comprising an optically based hydrophone.

27. The seismic sensing system of claim 24, wherein a signal from the sensors is multiplexed.

28. The seismic sensing system of claim 24, wherein the plurality of seismic stations is disposed within a clamping mechanism.

* * * * *